Patented Sept. 30, 1930

1,777,160

UNITED STATES PATENT OFFICE

ARTHUR BIDDLE, OF TRENTON, NEW JERSEY, ASSIGNOR TO UNITED PRODUCTS CORPORATION OF AMERICA, A CORPORATION OF DELAWARE

ALBUMINOUS ADHESIVE COMPOSITION OF MATTER

No Drawing.    Application filed July 21, 1927.    Serial No. 207,581.

This invention relates to blood albumen and inaqueous or normally water-resisting flexible gum colloids in combination with an alkaline earth hydroxide.

I have found that if inaqueous flexible gum colloids like gum chicle, chicle substitutes, balata, gutta-percha, rubber or rubber containing substances are combined with blood albumen that has been treated to or is in the presence of an alkaline earth hydroxide, the composition will possess properties of flexibility, adhesive strength, water-resistance and other qualities that the components of the composition do not possess alone.

By alkaline earth hydroxides are meant the hydroxides of, for example, calcium, magnesium, strontium or barium, but because of its great supply, economical use, alkalinity, greater solubility in the presence of certain chemicals, among other properties calcium hydroxide is to be preferred. Calcium hydroxide when in combination with other chemicals seems to make the albuminous composition more fluid and to stay fluid longer than when other alkaline earth hydroxides are used.

Although this invention deals with the inaqueous colloids in aqueous dispersion, the albumen treated with an alkaline earth hydroxide may be but not necessarily, the medium that brings the dispersion about. For instance, chicle or rubber may be dissolved in an organic solvent such as gasolene, benzol, xylol, heavy petroleum or heavy coal tar oils or any of the drying oils provided they are not strongly acid, and the solution so made may be aqueously dispersed by mixing therewith a dispersing medium which may be blood albumen or other dispersion agents. The best dispersions are those made by using solutions or aqueous mixtures of the dispersing agents at the start instead after the inaqueous colloid and the dispersing agent in dry form are mixed. Another way of several is to masticate the dry inaqueous colloid with a plastic mass of the aqueous or water-absorbing colloid which may or may not be blood albumen. However I find it preferable to use the natural aqueous dispersion of the inaqueous colloid or its latex when such is obtainable. A good example of natural inaqueous colloidal substances in aqueous dispersion is rubber latex. This latex is generally in commerce in a preserved condition, there having been added to it about 3% of ammonia. But other preservatives may be used or the pure or concentrated latex may be used.

As an example of my composition suitable as a strong glue I give the following:

|  | Parts by weight |
|---|---|
| Rubber latex | 100 |
| Blood albumen | 100 |
| Water | 200 |
| Calcium hydroxide | 20 |
| Sulphur | 4 |

The blood albumen is preferably first added slowly to the water and stirred until dissolved; the lime is then added either in dry or wet condition and the albumen mixture is then combined with the rubber latex.

In order to attain certain results it may be necessary to utilize or to add to the albuminous composition other ingredients or other water-soluble or water-absorbing colloids such as casein, animal or marine glues, starch and/or starch degradation products (cassava preferably being used), soaps, water-soluble oils, saponin, water-soluble gums like arabic, karaya, tragacanth, Irish moss jell, colloidal clays, silicate solutions and others. Or it may be desirable to emulsify or disperse in the composition as herein described such inaqueous substances that are not within the meaning of "inaqueous water-resisting flexible gum colloids". Of these might be mentioned, waxes, camphors either natural or coal tar, or dispersions thereof, etc. When such materials are added the composition is better suited for a plastic mass or base. Filling materials such as zinc oxide or stearates or other stearates, fibrous material, coloring matter and countless other materials well known in the adhesive, sizing, rubber and plastic arts may be mixed in with the dispersion herein disclosed in order to obtain definite results to satisfy certain needs.

Another example of my composition is as follows:

| | Parts by weight |
|---|---|
| Chicle (melted) | 10 |
| Tar (melted) | 10 |
| Rosin (melted) | 40 |
| Blood albumen | 20 |
| Casein | 40 |
| Lime | 90 |
| Sodium fluoride | 10 |
| Water | 300 |

Oils may be added to the chicle, tar and rosin to not only help to dissolve them but to give plastic and oxidizing and adhesive qualities to the composition.

I have also found that there is a broad class of chemical substances which combine readily with alkaline earth hydroxides, especially calcium hydroxide, and the union thereof brings about many new and useful results. Of these chemicals might be mentioned sodium and potassium carbonate, sequi-carbonate or bicarbonate, sodium or potassium sulphites and sulphides, sodium or potassium tungstate, phosphate, or triphosphates, borates, fluorides, or hydroxides. The acid radicals of the substances like fluorides, borates, phosphates, and other may be combined with other metallic bases but I have found that combinations of sodium and potassium are more reactive with the alkaline earth hydroxide and the other substances in the composition than the other metallic base compounds. These chemicals appear to combine with alkaline earth hydroxide to form new calcium or other alkaline earth compounds as the case may be. It also appears that the albumen (or other water-soluble colloids if used) combine with the alkaline earth hydroxide to form a salt therewith or to form a double salt with the alkaline earth hydroxide if a combining chemical as those above mentioned are added to the composition. This combination would make, for example, combinations as follows: calcium, magnesium or barium albuminate; or the calcium, magnesium or barium albumino carbonates, sulphites, sulphides, fluorides, phosphates and others as the case may be. The other chief product of such a double combination will generally be a caustic alkali as for instance the combining of calcium hydroxide with sodium fluoride will form calcium fluoride and sodium hydroxide, which hydroxide will have a strong stabilizing action on the inaqueous colloids and a strong solvent action on such water-soluble colloids as casein, starches, soaps and the like. The combinations of the inaqueous colloid and the blood albumen so made will be strong in adhesion and constitute a stable dispersed phase.

In the making of my new composition it is preferable to add the blood albumen in dry form (if used in that condition) to water at room temperature (hot water will prematurely coagulate the albumen) and to add the albumen slowly to the water to avoid foaming or lumps. The albumen to be used may be in blood form, but due to a tendency of the blood to decompose and because of objectionable feature of the pure blood it is best to use the refined albumen obtained from the blood. My invention also includes blood albumen obtained from blood that has been treated with chemicals like oxalic acid, sodium citrate, potassium citrate, or sodium oxalate. These modifying agents seem to break down or dissolve the fibrin in the blood or perform other changes to the blood or constituents thereof so that the adhesives made of the modified blood or the albumen thereof, possess, among other qualities greater strength and more mobility or fluidity. The addition of from about one to five percent (based on the dry weight of the albumen) of such a modifying agent will make the blood or the albumen obtained therefrom, dissolve in less water than if it had not been so treated, however, when blood albumen so derived is added or combined with an alkaline preserved substance like rubber latex care should be taken to neutralize any excess of acid as such excess of acid would tend to coagulate the latex.

It may be desirable to add insolubilizing agents to insolubilize the blood albumen and other water-soluble and insolubilizable colloids in the composition so as to make them water-resisting after removing substantially all the water from the composition, or otherwise the whole composition would not be entirely free of redispersing properties when later subjected to water, which is often undesirable. Among the insolubilizing agents that might be mentioned are, formaldehyde, paraformaldehyde, hexamethylenetetramine, calcium, zinc or copperchlorides, potassium chromate, alums, tannic acid or tannate compounds. From one to five percent (based on the dry weight of the substance to be insolubilized) is generally sufficient to accomplish the insolubilization of the water-soluble colloids.

Although hydroxides of the alkaline earth hydroxides are the substances usually used in practising my invention, the oxides of such substances are also to be included as coming within the scope of my invention, as the oxides will generally change to hydroxides in the presence of water. Further, the alkaline earth oxides or hydroxides may be the natural earthy product or the product of chemical processes as for example, the precipitated hydroxides. The alkaline hydroxides produced from calcined marine shells or bony matter may also be advantageously utilized in my invention.

The word adhesive as herein used is meant in its broadest sense and may be cohesive or adhesive in nature, in the dry or wet condition. It may mean a strong or comparatively weak glue, a sizing or a coating adhesive. It may be used as a strong wood glue or used as the base to make plastic materials or objects, that is, it may adhere, glue, hold, fix, bind or occlude countless small articles or finely ground material or more or less water-insoluble nature or fibrous matter.

Colloids like albumens, casein, glues and others are decomposable in the presence of water and especially when treated to alkalies. It is therefore advisable at times to add preserving agents to the composition or ingredients thereof that may decompose. Such agents may be essential oils like terpineol, cedar oil, creosote oil of bitter almonds and others. Preservents like sodium formate, copper chloride, sodium benzoate, beta or alpha napthol or sodium salicylate are good but do not scent the composition.

Alkalies like aqua ammonia, sodium carbonate and others are used to make the blood albumen or other water-soluble colloids more soluble and thereby increase their adhesiveness.

While I have herein described some particular compositions embodying my invention and methods of producing same and also mentioned some of the arts in which my invention may be utilized, it is to be understood that the invention is not limited to those arts, or to the precise methods or to the exact ingredients or proportions mentioned.

Having thus described my invention, I claim and desire to protect by Letters Patent of the United States:

1. An adhesive composition comprising an aqueous dispersion of a normally flexible elastic water resisting flexible gum colloid, blood albumen and an alkaline earth hydroxide.

2. An adhesive composition comprising rubber, blood albumen and an alkaline earth hydroxid in aqueous dispersion.

3. An adhesive composition comprising an aqueous dispersion of a normally flexible elastic water-resisting gum colloid, blood albumen and calcium hydroxide.

4. An adhesive composition comprising an aqueous dispersion of rubber, calcium hydroxide, and blood albumen.

5. An adhesive composition in aqueous dispersion comprising rubber latex, an alkaline earth hydroxide and blood albumen.

In witness whereof I set my hand this 19th day of July, 1927.

ARTHUR BIDDLE.